United States Patent [19]

Miyamae

[11] 3,927,487
[45] Dec. 23, 1975

[54] FISHING ROD HOLDING LEVERAGE DEVICE

[76] Inventor: Toshiaki Miyamae, 2-16, 2-chome, Nishi-Iwata, Higashi-Osaka, Osaka, Japan

[22] Filed: July 2, 1974

[21] Appl. No.: 485,217

[52] U.S. Cl. ............................................... 43/21.2
[51] Int. Cl.² .......................................... A01K 97/10
[58] Field of Search ............................... 43/21.2, 15

[56] References Cited
UNITED STATES PATENTS

| | | | |
|---|---|---|---|
| 2,564,625 | 8/1951 | Jackson et al. | 43/21.2 |
| 2,650,052 | 8/1953 | Bintz | 43/21.2 |
| 2,786,296 | 3/1957 | Loebensteen | 43/21.2 |

Primary Examiner—Warner H. Camp
Attorney, Agent, or Firm—Moonray Kojima

[57] ABSTRACT

A fishing rod holder means slidably mountable on an edge of a boat includes a plate fixed to an externally angular portion of a bracket extending at a right angle, a means attached to a rod and pivoted on said bracket by means of a pin and screwably tightening means slidably mounted to said bracket.

Said plate includes an arc shape opening to receive a mating arc shape vertical section formed in both ends of said pin so as to be releasably engaged with said opening at a given angle whereby the rod is freely operable in vertical directions and easily disengaged from the device by slightly moving the pin in the plate.

1 Claim, 2 Drawing Figures

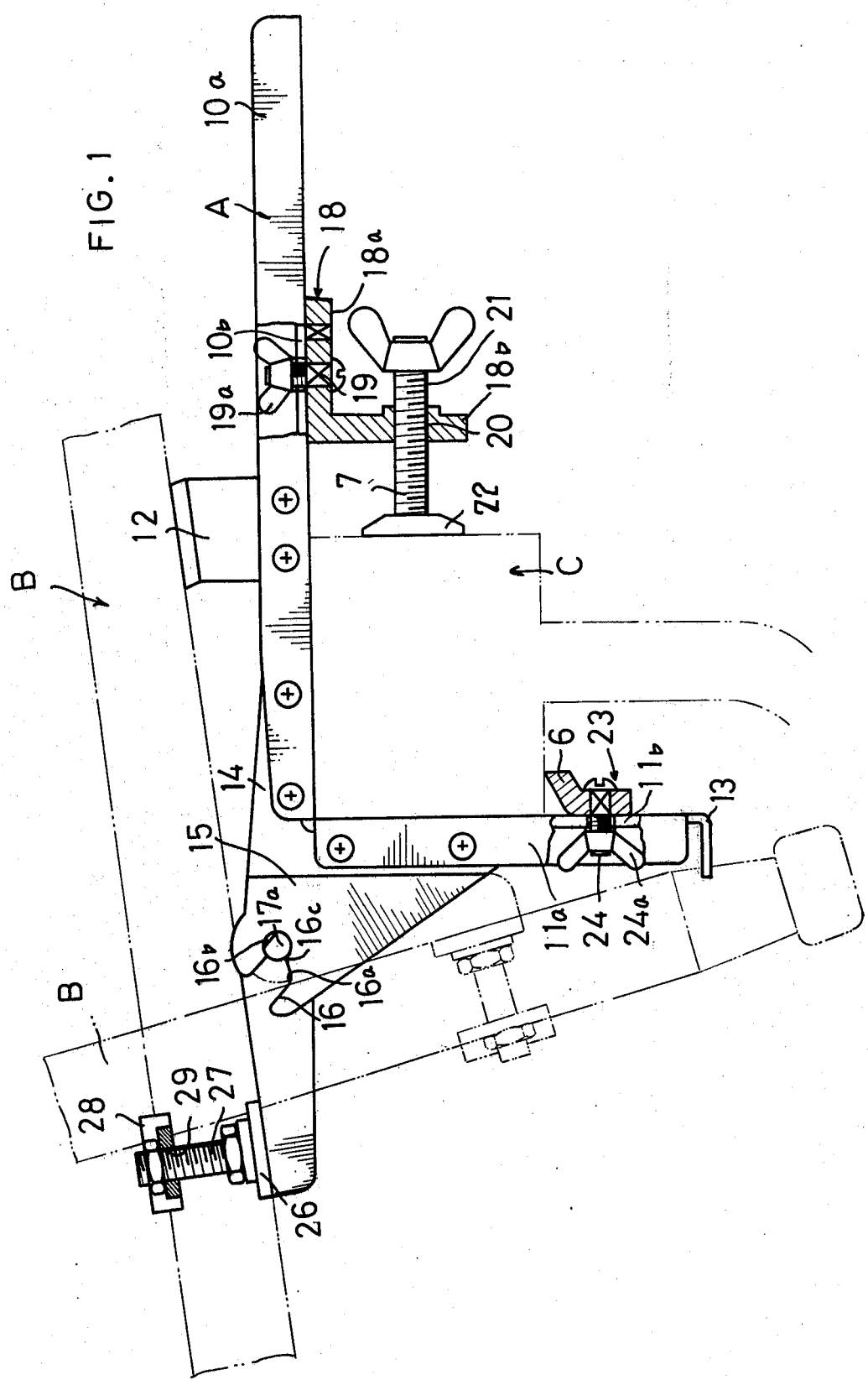

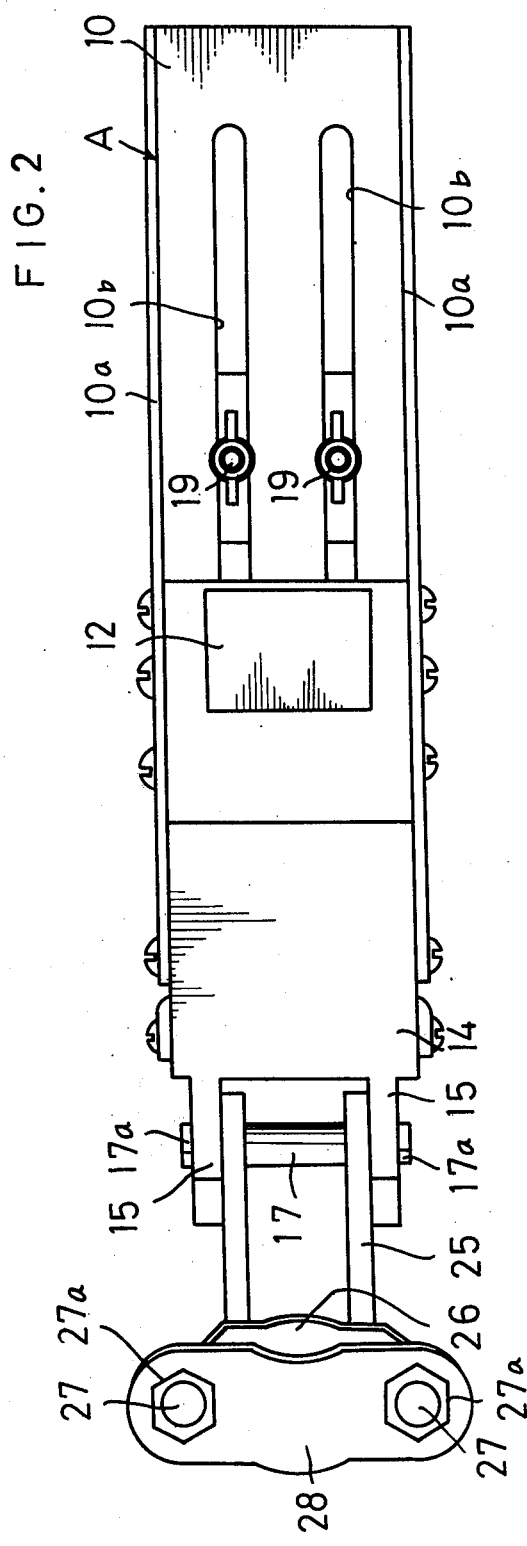

FISHING ROD HOLDING LEVERAGE DEVICE

The present invention relates generally to improvements in a holding device, and more particularly to a fishing rod releasable holding leverage device as in a boat.

When fishermen enjoy fish game in a boat, it is customary with them to use a fishing rod provided with a considerably heavy-weight reel, supporting the rod for a long while with both hands grasping a grip portion of the rod. However, a sustaining operation of holding a rod with hands in a boat always moving about on the wave easily makes fishermen feel fatigued and impatient. In recent years, therefore, many attempts have been made to provide such rod holding or supporting means that the fishing rod can be directly set on one side of a boat thereby releasing fishermen from the above-mentioned painstaking fishing operation. For example, most of the fishing rod supporting means on the market are such that they are fixedly mounted on the edge of the gunwale of a fishing boat so that the rod is directly mounted thereon or that one side of the rod supporting means is rigidly attached adjacent to the hand grip portion of the rod with the other side detachably engaged with the edge of the gunwale. However, the above-mentioned rod supporting means are too heavy in weight for fishermen to freely use a fishing rod and quickly operate a reel provided thereon, consequently depriving fishermen of a chance to enjoy the charm of fish game.

Accordingly, the present invention has been made to eliminate the above-mentioned drawbacks and disadvantages, and has as one of its main objects the provision of a device for holding a fishing rod in a fixed position, as in a boat, comprising a bracket openmouthed with a notched slot and fixedly attached to the boat in a desired location, and a rod supporting member provided with a supporting pin insertible into said notched slot portion and attached adjacent to the hand grip portion of a fishing rod whereby the supporting member is not only movable with respect to the bracket but also disengageable therewith.

It is another object of the invention to provide a fishing rod holding device adapted so that a fishing rod can be moved in vertical directions through said supporting pin, and if desired, removed from said bracket together with said rod supporting member thereby enabling fishermen to enjoy the charm of fish game in a comfortable posture in a boat.

These and other objects, features and advantages of the invention will become apparent in the following description made in connection with the accompanying drawings in which like reference characters refer to similar parts throughout the views and in which:

FIG. 1 is a partially cutaway side elevation view showing a preferred embodiment of the invention; and FIG. 2 is a top plan view thereof.

Referring now to the accompanying drawings, and first more particularly to FIG. 1, reference character A designates a main bracket of a substantially L shape in vertical section formed with a horizontal bracket member 10 and a vertical bracket member 11. Said bracket members 10 and 11 are provided along the edges thereof with a pair of bracket edge members 10a and 11a, thus forming a U shape in vertical section. Said horizontal bracket member 10 is formed with one or more longitudinal slots 10b. Likewise, said vertical bracket member 11 is also formed with one or more longitudinal slots 11b. Upon said horizontal bracket member 10 and adjacent to the center thereof a fishing rod supporting element 12 is provided.

In the lowermost end of the vertical bracket member 11 is provided a rod portion contact element 13. Fixedly attached to the portion wherein the main bracket A is bent at a right angle to form said L shape vertical section thereof is a supporting means 14 for pivotally supporting a fishing rod B to the main bracket A.

Mounted to said supporting means 14 through the bracket edge members 10a, 11a are a pair of upright walls 15 each openmouthed with a notched slot 16. Said notched slot 16 is slightly greater in width than the outer diameter of a fulcrum pin 17 to be described hereinafter, and formed midway with a recessed portion 16a. Between said recessed portion 16a and an arc-shaped slot portion 16b there is formed a narrow guide path 16c which is slightly smaller in width than the outer diameter of the fulcrum pin 17.

A substantially L shape fixture means 18 is formed with a horizontal fixture member 18a and a vertical fixture member 18b each having an end encountering at a right angle. Said fixture means 18 is slidably mounted to a desired gunwale portion C for example by inserting into the slot 10b a bolt 19 fixed upright to the horizontal fixture member 18a and tightening the foremost end of the bolt 19 with a thumb nut 19a.

Said vertical fixture member 18b is bored with a screw hole 20 into which a pressing bolt or thumb screw 21 having a pressing plate 22 rigidly fixed to the foremost end thereof is inserted to screwably move back and forth in the direction parallel to the horizontal bracket member 10 so that when the thumb screw 21 is screwably moved forth in the screw hole 20, the pressing plate 22 is forced to press the gunwale portion C against the vertical bracket member 11 thereby fixing the main bracket A laterally to the gunwale portion C.

In the slot 11b of the vertical bracket member 11 is also slidably inserted a bolt 24 fixed to a fixture means 23 so that the main bracket A can be fixed vertically to a desired gunwale portion C by moving the fixture means 23 along the slot 11b and screwably tightening the bolt 24 for example with a thumb nut 24a.

In one end of a movable element 25 shown in FIG. 2 is fixedly supported said fulcrum pin 17 in lateral direction while the other end fixedly supports a rod portion receiving member 26 provided with bolts 27 at both ends. On said rod portion receiving element 26 is put a rod holding member 28 which is bored in both ends with holes 29 through which the bolts 27 are inserted. Both ends 17a of the flucrum pin 17 are partially cut in axial direction to form an arc shape in vertical section whereby the fulcrum pin 17 is insertible into said narrow guide path 16c of the notched slot 16.

The fishing rod holding means of the invention thus formed will be practically utilized in the following manner.

In the first place, the main bracket A is mounted on the gunwale C of a boat in a manner that the vertical bracket member 11 is disposed internally of the boat. Then the fixture means 18 provided under the horizontal bracket member 10 is slid along the outside of the gunwale C through the slot 10b and ridigly fixed to the member 10 by means of the bolt 19 and the thumb nut 19a. Thereafter the thumb screw or pressing bolt 21 is screwably moved to forcibly press the pressing plate 22 against the gunwale C. Meanwhile the fixture means 23 provided on the vertical bracket member 11 is also slid along the inner lower part of the gunwale C through the slot 11b and rigidly fixed thereto by means of the bolt 24 and the nut 24a thereby fixedly mounting the main bracket A to a desired gunwale portion C.

Nextly, a rod portion B adjacent to the hand grip portion of the rod is placed on the receiving member 26 of the pivotally movable element 25. Then the rod holding member 28 is placed on the receiving member 26 and the bolts 27 are inserted into holes 29 therby to fixedly hold the rod portion B between the members 26 and 28 by screwably tightening the bolts 27 with tightening nuts 27a.

Thereafter the both ends 17a of the fulcrum pin 17 are inserted into the notched slot 16 of the supporting means 14 until they reach the narrow guide path 16c. Then the pivotally movable element 25 is slightly moved until the arc shape vertical section of the fulcrum pin 17 is conformed with the width of the arc shape slot portion 16b thereby orienting the both ends 17a of the fulcrum pin 17 in the recessed portion 16a of the notched slot 16.

Furthermore, the middle portion of the fishing rod B is supported on the rod supporting element 12 mounted on the horizontal bracket member 10 whereby the rod is fixedly supported on the main bracket A. In this case, the fishing rod B is rigidly fixed to the gunwale C by means of the rod holding member 28 and the fulcrum pin 17 of the pivotally movable element 25 engaged with the notched slot 16. Thus the fulcrum pin 17 received in the arc shape slot portion 16b through the narrow guide path 16c is prevented from coming off the notched slot 16 so that fishermen are able to enjoy fish game in a comfortable posture without the fear that the fishing rod B might be stepped upon by the motion of the boat.

By the above-mentioned arrangement of the fishing rod holding means in accordance with the present invention, fishermen are able to handle the fishing rod B as freely as they want subject to the size and kind of a catch. In other words, when a catch is too big for fishermen to raise the rod B by hands, fishermen may operate a reel to draw the catch toward the gunwale C by holding the hand grip portion of the rod B and moving the rod B up and down about the fulcrum pin 17 until the catch becomes fatigued. On the other hand, if a catch is a small fish or a big but weakened fish, fishermen may draw it toward the gunwale C by slightly pushing down the hand grip portion of the rod B to conform said axially cut ends 17a of the fulcrum pin 17 with the guide path 16c of the notched slot 16, thereafter pulling the pin 17 this side whereby the pin 17 is disengaged from the notched slot 16, the result being that fishermen are able to operate the fishing rod B as freely as they want by raising the rod B together with the pivotally movable element 25 from the main bracket A. After the catch has been taken up into the boat, the fulcrum pin 17 is returned to the arc shape slot portion 16b so as to bring said rod portion into contact with the contact element 13 disposed in the end of the vertical bracket member 11 whereby the rod B is stably held on the gunwale C in downwardly inclined relation thereto.

As has been clearly mentioned in the foregoing, the fishing rod holding means of the invention is mainly constructed with the main bracket A, the pivotally movable element 25 independently provided thereof, a rod supporting means 14 attached to the main bracket A and the fulcrum pin 17 insertible into the notched slot 16 of the upright walls 15 at a given angle to the slot 16 so that the main bracket A is disengageably insertible into the element 25 merely by moving the pin 17 a little in the notched slot 16.

Though one specific embodiment of the present invention has been shown and described herein, it will be apparent to those skilled in the art that the invention is not restricted to the details set forth but many changes and modifications may be made without departing from the spirit and scope of the invention as defined in the annexed claims.

What is claimed is:

1. A fishing rod holding device comprising
A. anchoring means comprising a vertical plate and joined thereto at substantially right angles a horizontal plate, adjustable means disposed on both said vertical plate and said horizontal plate for anchoring said device, said anchoring means further comprising a fishing rod support means;
B. a pair of vertically disposed holding plates attached to said anchoring means at the juncture of said vertical and horizontal plates, said holding plates each having a hole of a first diameter aligned with each other and a larger diameter opening interconnected by a passageway having a width smaller than said diameter of said holes, the axis of said holes being located above the plane of said horizontal plate of said anchoring means;
C. receiving means comprising a pair of receiving elements shaped suitably to fit a fishing rod handle therebetween, a pair of adjustable bolt means, and means for engaging with said holding plates, said pair of adjustable bolt means connected to said means for engaging and holding fixedly said receiving elements with said fishing rod handle fit therebetween, said means for engaging comprising a structure means and a fulcrum shaft means having an axis alignable with said axis of said holes of said holding plates and having at each end thereof portions of a diameter substantially equal to the said diameter of said holes, and a portion thereof cut axially with the remaining diameter width substantially similar to the width of said passageway of said holding means, whereby said receiving means is readily engageable with said holding plate by suitable vertical rotation and fitting of said cut portion of said shaft means through said opening and through said passageway and placement of said shaft means within said holes, thereby locking said shaft means within said hole for rotation to any radial position and thereby enabling removal by the reverse operation of rotating and passage of the cut portion through said passageway and whereby said fishing rod held by said receiving means is easily locked and rested on said fishing rod support means of said anchoring means in a rest position and readily rotated about said shaft means to another position.

* * * * *